US012743614B2

(12) United States Patent
Ma et al.

(10) Patent No.: US 12,743,614 B2
(45) Date of Patent: Sep. 22, 2026

(54) METHOD FOR TRAINING ASYMMETRIC GENERATIVE ADVERSARIAL NETWORK TO GENERATE IMAGE AND ELECTRIC APPARATUS USING THE SAME

(71) Applicant: PHISON ELECTRONICS CORP., Miaoli (TW)

(72) Inventors: Yi-Hsiang Ma, New Taipei City (TW); Szu-Wei Chen, New Taipei City (TW); Yu-Hung Lin, Miaoli County (TW); An-Cheng Liu, Taipei City (TW)

(73) Assignee: PHISON ELECTRONICS CORP., Miaoli (TW)

( * ) Notice: Subject to any disclaimer, the term of this patent is extended or adjusted under 35 U.S.C. 154(b) by 1052 days.

(21) Appl. No.: 17/460,274

(22) Filed: Aug. 29, 2021

(65) Prior Publication Data

US 2023/0037782 A1 Feb. 9, 2023

(30) Foreign Application Priority Data

Aug. 5, 2021 (TW) ................................ 110128994

(51) Int. Cl.
*G06N 3/08* (2023.01)
*G06F 18/2431* (2023.01)
(Continued)

(52) U.S. Cl.
CPC .......... *G06N 3/08* (2013.01); *G06F 18/2431* (2023.01); *G06N 3/045* (2023.01); *G06T 5/50* (2013.01); *G06T 2207/20224* (2013.01)

(58) Field of Classification Search
CPC . G06N 3/08; G06N 3/045; G06T 5/50; G06T 2207/20224; G06F 18/2431
See application file for complete search history.

(56) References Cited

U.S. PATENT DOCUMENTS

2022/0108434 A1* 4/2022 Donahue .............. G06T 7/0002

FOREIGN PATENT DOCUMENTS

| CN | 110047056 | 7/2019 |
|---|---|---|
| CN | 111753980 | 10/2020 |

OTHER PUBLICATIONS

Singh et al., Generative adversarial networks for synthetic defect generation in assembly and test manufacturing. In 2020 31st Annual SEMI Advanced Semiconductor Manufacturing Conference (ASMC) (Year: 2020).*

(Continued)

*Primary Examiner* — Adam C Standke
(74) *Attorney, Agent, or Firm* — JCIPRNET

(57) ABSTRACT

A method for training an asymmetric generative adversarial network to generate an image and an electronic apparatus using the same are provided. The method includes the following. A first real image belonging to a first category, a second real image belonging to a second category and a third real image belonging to a third category are input to an asymmetric generative adversarial network for training the asymmetric generative adversarial network, and the asymmetric generative adversarial network includes a first generator, a second generator, a first discriminator and a second discriminator. A fourth real image belonging to the second category is input to the first generator in the trained asymmetric generative adversarial network to generate a defect image.

25 Claims, 5 Drawing Sheets

(51) Int. Cl.
*G06N 3/045* (2023.01)
*G06T 5/50* (2006.01)

(56) References Cited

OTHER PUBLICATIONS

Tang, Hao et al., "Asymmetric generative adversarial networks for image-to-image translation." arXiv preprint arXiv:1912.06931 (Year: 2019).*
Zhu et al. "Unpaired Image-to-Image Translation using Cycle-Consistent Adversarial Networks." (2020): arXiv:1703.10593v7 (Year: 2020).*
Niu, Shuanlong, et al. "Defect image sample generation with GAN for improving defect recognition." IEEE Transactions on Automation Science and Engineering 17.3 (Year: 2020).*
"Office Action of Taiwan Counterpart Application", issued on Mar. 3, 2023, p. 1-p. 32.

* cited by examiner

METHOD FOR TRAINING ASYMMETRIC GENERATIVE ADVERSARIAL NETWORK TO GENERATE IMAGE AND ELECTRIC APPARATUS USING THE SAME

CROSS-REFERENCE TO RELATED APPLICATION

This application claims the priority benefit of Taiwan application serial no. 110128994, filed on Aug. 5, 2021. The entirety of the above-mentioned patent application is hereby incorporated by reference herein and made a part of this specification.

BACKGROUND

Technical Field

The disclosure relates to a generative adversarial network (GAN), and in particular to a method for training an asymmetric generative adversarial network to generate an image and an electronic apparatus using the same.

Description of Related Art

In recent years, training a neural network model to perform image recognition has become an important issue in the field of computer vision. For example, a defect classification model is trained to detect defects in element images to detect elements with defects among multiple elements. The performance of the neural network model depends on the quality, variety and quantity of training data. However, it is usually difficult to collect abnormal data (for example, flawed samples or negative samples) in advance in the real world. The scarcity of abnormal data reduces the recognition performance of a trained model in application. Therefore, in order to obtain diverse training data sets, it often takes time and labor to collect more abnormal data, which are scarce. As a result, a large amount of time and labor costs are required.

A generative adversarial network (GAN) trains a generator through the differences between real data and fake data generated by the generator, so that the trained generator may generate a large amount of fake data based on the real data to supplement the abnormal data which are lacked in the neural network model. Generally, GAN is a machine learning model including a generator and a discriminator.

However, in the early stages of manufacturing, there are usually no actual abnormal elements of new elements. A conventional GAN cannot train a generator to generate fake-abnormal data when there are no abnormal data of the new elements in the training data set. Therefore, for those skilled in the art, there is a need to improve the method for generating fake data.

SUMMARY

The disclosure provides a method for training an asymmetric generative adversarial network (GAN) to generate an image and an electronic apparatus using this method, which improve the image conversion performance of a generator in the asymmetric GAN.

The disclosure proposes a method for training an asymmetric GAN to generate an image, which is adapted for an electronic apparatus including a processor. The method includes the following. A first real image belonging to a first category, a second real image belonging to a second category, and a third real image belonging to a third category are input to an asymmetric GAN to train the asymmetric GAN, and the asymmetric GAN includes a first generator, a second generator, a first discriminator, and a second discriminator. A fourth real image belonging to the second category is input to the first generator in the trained asymmetric GAN to generate a defect image. The first generator receives the second real image and generates a second generated image accordingly, and the second generator receives the second generated image and generates a second reconstructed image accordingly. The first generator executes an operation to generate a second value according to the second real image and the second reconstructed image, and updates a parameter of the first generator according to the second value. The first real image and the third real image do not have defective features, and the second real image and the fourth real image have defective features. The defect image belongs to a fourth category, and the fourth category does not have a training sample.

In an embodiment of the disclosure, the first generator receives the first real image and generates a first generated image accordingly, and the second generator receives the first generated image and generates a first reconstructed image accordingly. The first generator executes an operation to generate a first value according to the first real image and the first reconstructed image, and updates the parameter of the first generator according to the first value.

In an embodiment of the disclosure, the first discriminator distinguishes between the first generated image and a third real image belonging to a third category to generate a first discrimination value. In addition, the first generator updates the parameter of the first generator according to the first discrimination value.

In an embodiment of the disclosure, the first discriminator is characterized as multiple third neural network weights, and the first discriminator updates a parameter of the first discriminator according to the first discrimination value.

In an embodiment of the disclosure, the first generator performs a subtraction between the first real image and the first reconstructed image to generate the first value, and performs a subtraction between the second real image and the second reconstructed image to generate the second value.

In an embodiment of the disclosure, the first generator is characterized as multiple first neural network weights, and updating the parameter of the first generator includes the following. The first neural network weights are updated while a first generation loss function is minimized.

In an embodiment of the disclosure, the second generator receives the third real image and generates a third generated image accordingly, and the first generator receives the third generated image and generates a third reconstructed image accordingly. The second discriminator distinguishes between the third generated image and the first real image to generate a second discrimination value. In addition, the second generator executes an operation to generate a third value according to the third real image and the third reconstructed image, and updates a parameter of the second generator according to at least one of the second discrimination value and the third value.

In an embodiment of the disclosure, the second discriminator is characterized as multiple fourth neural network weights, and the second discriminator updates a parameter of the second discriminator according to the second discrimination value.

In an embodiment of the disclosure, the second generator is characterized as multiple second neural network weights, and updating the parameter of the second generator includes the following. The second neural network weights are updated while a second generation loss function is minimized.

In an embodiment of the disclosure, the second generator performs a subtraction between the third real image and the third reconstructed image to generate the third value.

In an embodiment of the disclosure, the asymmetric GAN executes multiple iterative operations to train the first generator, the second generator, the first discriminator, and the second discriminator.

In an embodiment of the disclosure, the iterative operations include the following. The first discriminator and the first generator are updated according to the first real image when a first iterative operation is executed. The first generator is updated according to the second real image when a second iterative operation is executed. The second discriminator and the second generator are updated according to the third real image when a third iterative operation is executed.

The disclosure proposes an electronic apparatus that uses training an asymmetric GAN to generate an image. The electronic apparatus includes a storage device and a processor. The storage device is configured to store a real image data set and one or more instructions. The processor is coupled to the storage device, and is configured to execute the instructions: inputting a first real image belonging to a first category, a second real image belonging to a second category, and a third real image belonging to a third category to an asymmetric GAN to train the asymmetric GAN, while the asymmetric GAN includes a first generator, a second generator, a first discriminator, and a second discriminator; and inputting a fourth real image belonging to the second category to the first generator in the trained asymmetric GAN to generate a defect image. The first generator receives the second real image and generates a second generated image accordingly, and the second generator receives the second generated image and generates a second reconstructed image accordingly. The first generator executes an operation to generate a second value according to the second real image and the second reconstructed image, and updates a parameter of the first generator according to the second value. The first real image and the third real image do not have defective features, and the second real image and the fourth real image have defective features. The defect image belongs to a fourth category, and the fourth category does not have a training sample.

In an embodiment of the disclosure, the first generator receives the first real image and generates a first generated image accordingly, and the second generator receives the first generated image and generates a first reconstructed image accordingly. In addition, the first generator executes an operation to generate a first value according to the first real image and the first reconstructed image, and updates the parameter of the first generator according to the first value.

In an embodiment of the disclosure, the first discriminator distinguishes between the first generated image and a third real image belonging to a third category to generate a first discrimination value. In addition, the first generator updates the parameter of the first generator according to the first discrimination value.

In an embodiment of the disclosure, the first discriminator is characterized as multiple third neural network weights, and the first discriminator updates a parameter of the first discriminator according to the first discrimination value.

In an embodiment of the disclosure, the first generator performs a subtraction between the first real image and the first reconstructed image to generate the first value, and performs a subtraction between the second real image and the second reconstructed image to generate the second value.

In an embodiment of the disclosure, the first generator is characterized as multiple first neural network weights, and the operation of updating the parameter of the first generator includes the following. The first neural network weights are updated while a first generation loss function is minimized.

In an embodiment of the disclosure, the second generator receives the third real image and generates a third generated image accordingly, and the first generator receives the third generated image and generates a third reconstructed image accordingly. The second discriminator distinguishes between the third generated image and the first real image to generate a second discrimination value. In addition, the second generator executes an operation to generate a third value according to the third real image and the third reconstructed image, and updates a parameter of the second generator according to at least one of the second discrimination value and the third value.

In an embodiment of the disclosure, the second discriminator is characterized as multiple fourth neural network weights, and the second discriminator updates a parameter of the second discriminator according to the second discrimination value.

In an embodiment of the disclosure, the second generator is characterized as multiple second neural network weights, and the operation of updating the parameter of the second generator includes the following. The second neural network weights are updated while a second generation loss function is minimized.

In an embodiment of the disclosure, the second generator performs a subtraction between the third real image and the third reconstructed image to generate the third value.

In an embodiment of the disclosure, the asymmetric GAN executes multiple iterative operations to train the first generator, the second generator, the first discriminator, and the second discriminator.

In an embodiment of the disclosure, the iterative operations include the following. The first discriminator and the first generator are updated according to the first real image when a first iterative operation is executed. The first generator is updated according to the second real image when a second iterative operation is executed. The second discriminator and the second generator are updated according to the third real image when a third iterative operation is executed.

Based on the above, in the method for training an asymmetric GAN to generate an image and the electronic apparatus using this method proposed by this exemplary embodiment, machine learning is executed to train the asymmetric GAN to update the parameter of the first generator, the second generator, the first discriminator, and the second discriminator. In this way, the trained asymmetric GAN transfers the defect features of an element onto the image of another element to generate a defect image, thereby improving the performance of image conversion of the generator.

To provide a further understanding of the above features and advantages of the disclosure, embodiments accompanied with drawings are described below in details.

DESCRIPTION OF THE EMBODIMENTS

Figure 1:
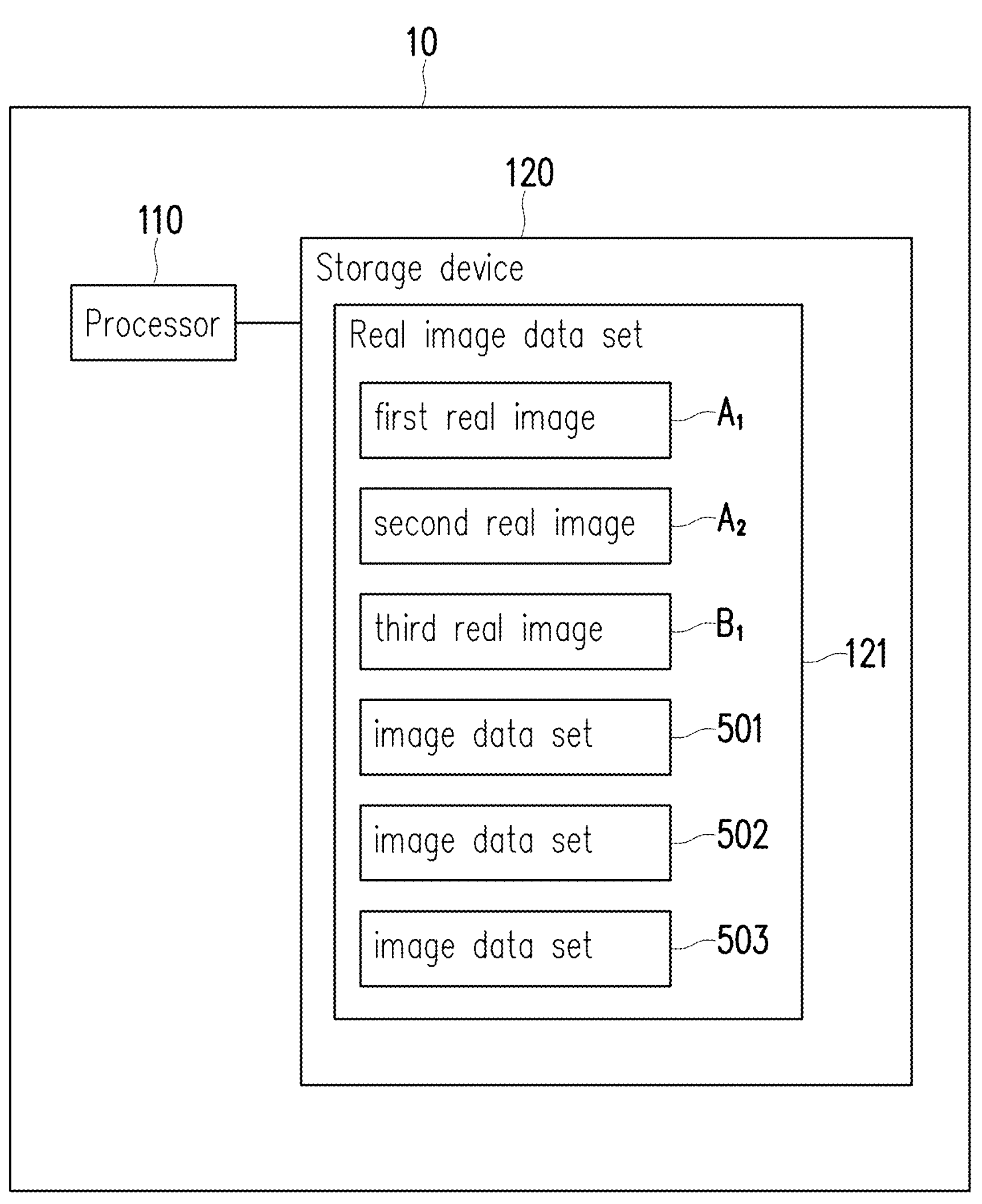
FIG. 1 illustrates a block diagram of an electronic apparatus according to an exemplary embodiment.

The terms "first" and "second" mentioned in the full text of the specification of this application (including the claims) are used to name the elements, or to distinguish between different embodiments or scopes, and are not used to limit the upper limit or lower limit of the number of elements or to limit the order of elements.

Elements/components/steps with the same reference numeral in the drawings and embodiments in the specification of this application represent the same or similar parts. Related descriptions of elements/components/steps that use the same reference numeral or use the same terms in different embodiments may be referred to. These embodiments are only part of the disclosure and do not disclose all the implementation methods of the disclosure.

FIG. 1 illustrates a block diagram of an electronic apparatus according to an exemplary embodiment. Referring to FIG. 1, an electronic apparatus 10 includes a processor 110 and a storage device 120.

The processor 110 is coupled to the storage device 120 and executes instructions stored in the storage device 120. The processor 110 is, for example, a central processing unit (CPU), or other programmable general-purpose or special-purpose elements, such as a micro control unit (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar elements or a combination of the above elements.

The storage device 120 is, for example, any type of fixed or removable element, such as a random access memory (RAM), a read-only memory (ROM), a flash memory, a hard disk drive (HDD), a solid state drive (SSD), or similar elements or a combination of the above elements. The storage device 120 is used to store a variety of data and one or more computer-readable instructions that may be executed by the processor 110.

These computer-readable instructions may include logic or algorithms written in any programming language. The programming language may be a machine language that may be directly executed by the processor 110, or an assembly language, object-oriented programming (OOP), a scripting language, or a microcode that may be compiled or assembled into computer-readable instructions and stored in the storage device 120, and the disclosure is not limited thereto. On the other hand, the computer-readable instructions may also be written in a hardware description language (HDL), which is, for example, logic that may be implemented through an FPGA configuration, ASIC, or other equivalents. Therefore, the functions described in this exemplary embodiment may be implemented by any traditional computer programming language, pre-programmed hardware elements, or a combination of hardware and software elements to implement a method for training an asymmetric generative adversarial network (GAN), and the disclosure is not limited thereto.

In this exemplary embodiment, a real image data set 121 may be stored in the storage device 120. Images included in the real image data set 121 may be obtained by capturing elements with a camera. The real image data set 121 may include a plurality of real images, and each real image belongs to a different category. For example, a first category may be a category of "non-defect images (also known as first real images) of a first element", a second category may be a category of "defect images (also known as second real images) of the first element", and a third category may be a category of "non-defect images (also known as third real images) of a second element". It should be noted that a category lacking representativeness in this exemplary embodiment does not have a training sample; that is, the real image data set 121 does not include any real image belonging to a fourth category (for example, a category of "defect images of the second element"). In this exemplary embodiment, the first element and the second element are different elements in the real world. An image that belongs to the category of non-defect images indicates that the image does not have defect features, so elements included in the image are determined as good. An image belonging to the category of defect images indicates that the image has defect features, so elements included in the image are determined as damaged (for example, the elements are damaged or have shifted).

Figure 2:
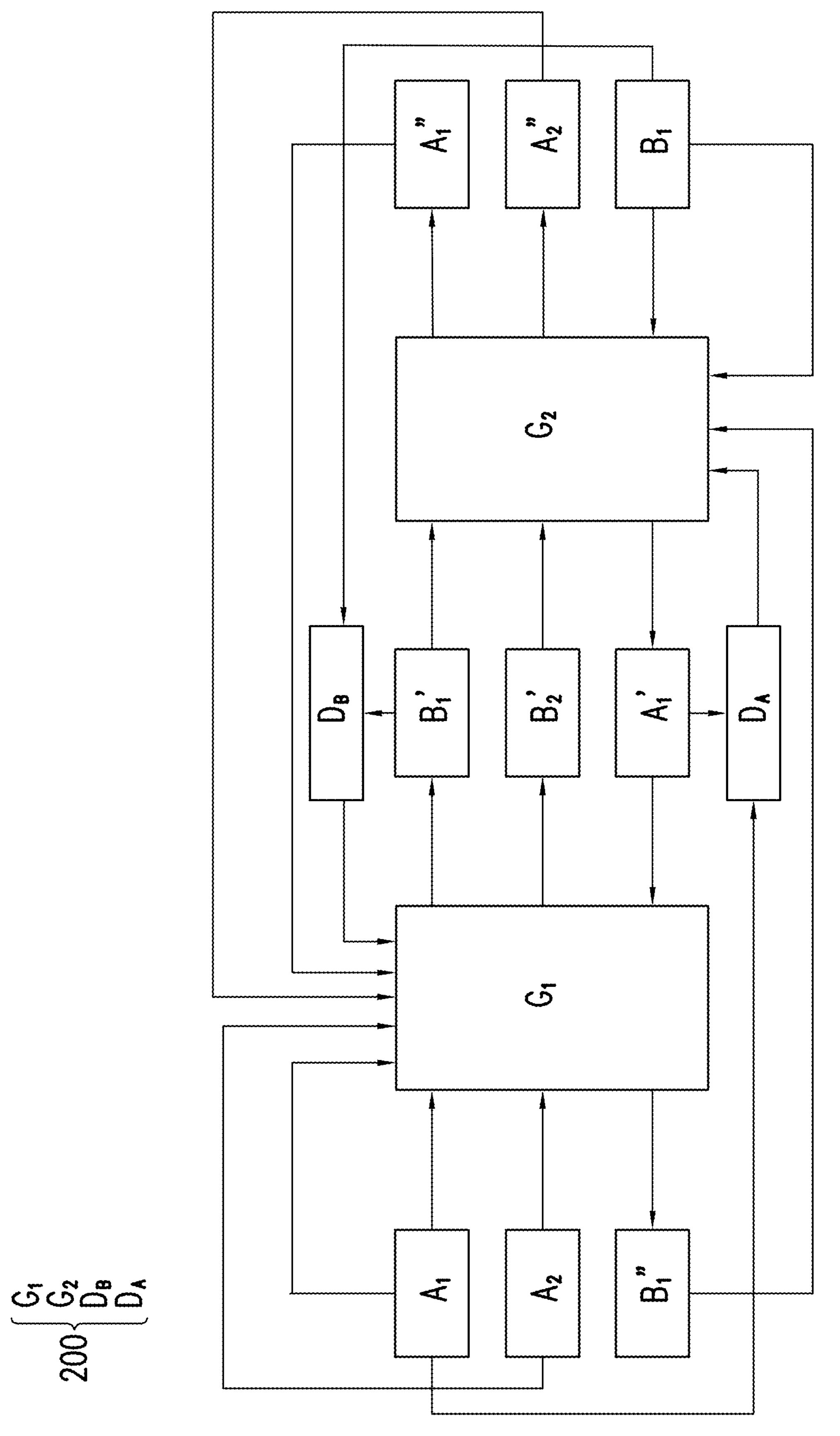
FIG. 2 illustrates a schematic diagram of a mechanism for training an asymmetric generative adversarial network (GAN) according to an exemplary embodiment.

FIG. 2 illustrates a schematic diagram of a mechanism for training an asymmetric GAN according to an exemplary embodiment. Referring to FIG. 2, an asymmetric GAN 200 is an adversarial learning system used to generate realistic synthetic images from unpaired real-world image data in an unsupervised model based on a cycle GAN.

In this exemplary embodiment, the asymmetric GAN 200 includes a first generator $G_1$, a second generator $G_2$, a first discriminator $D_B$, and a second discriminator $D_A$. The first generator $G_1$, the second generator $G_2$, the first discriminator $D_B$, and the second discriminator $D_A$ are all neural networks. The first generator $G_1$ and the second generator $G_2$ may execute image conversion, and may execute learning similar to cycle GAN learning together with the first discriminator $D_B$ and the second discriminator $D_A$ to update parameters. For example, the first generator $G_1$ and the second generator $G_2$ may include a convolutional neural network (CNN). The first discriminator $D_B$ and the second discriminator $D_A$ may be implemented as CNN-based classifiers, including, for example, a convolution layer and a fully connected layer.

Figure 3:
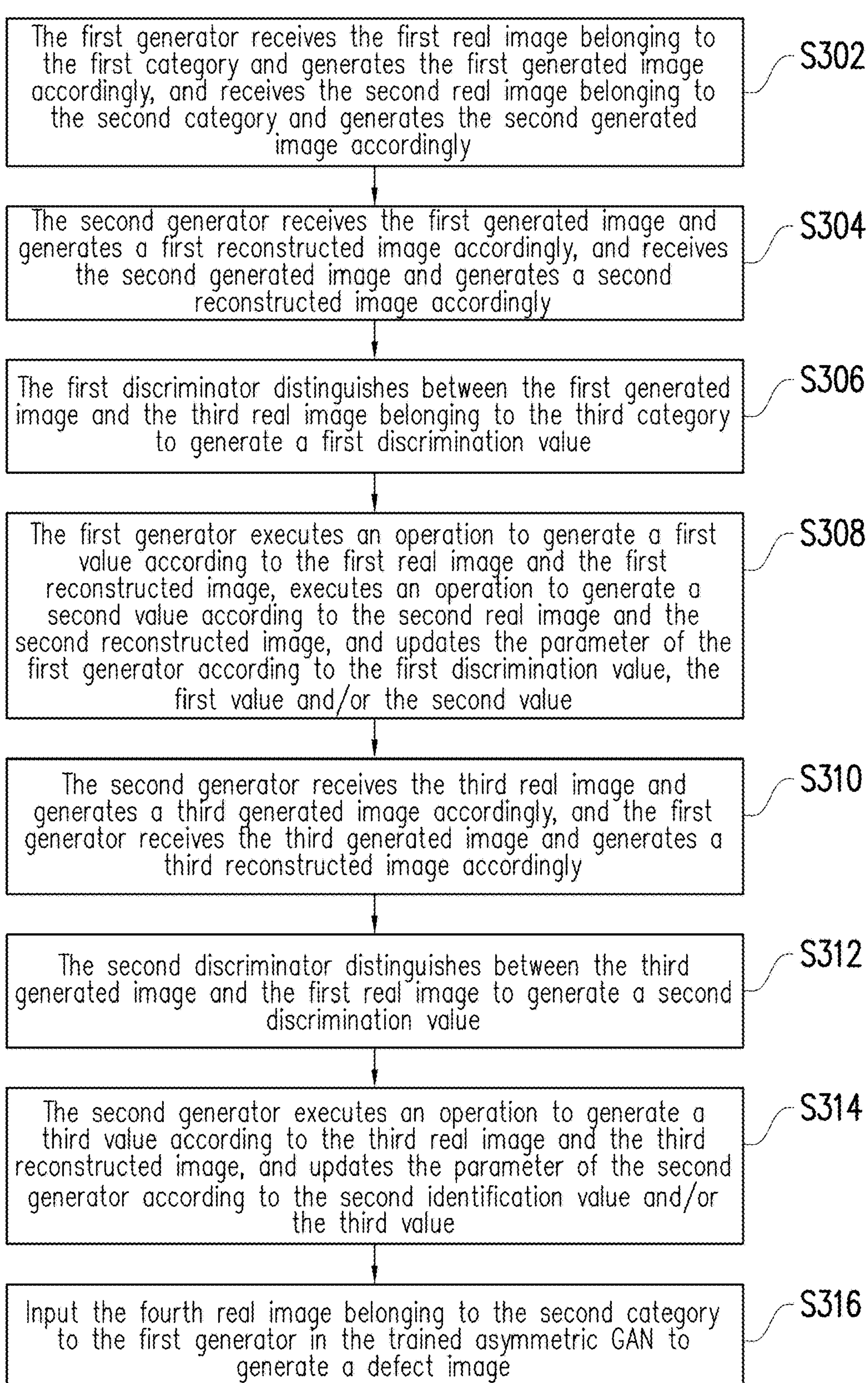
FIG. 3 illustrates a flow chart of a method for training an asymmetric GAN to generate an image according to an exemplary embodiment.

FIG. 3 illustrates a flow chart of a method for training an asymmetric GAN to generate an image according to an exemplary embodiment. Referring to FIG. 3, the method in this exemplary embodiment is adapted for being executed by a training system (for example, the processor 110 in FIG. 1) used to train the asymmetric GAN 200 in FIG. 2. The following illustrates the detailed steps of the method for training the asymmetric GAN to generate an image of this embodiment by using the embodiment of FIG. 2.

In an exemplary embodiment, before the asymmetric GAN 200 executes the method for training the asymmetric GAN to generate an image, the processor 110 may execute initial parameter setting for each of the first generator $G_1$, the second generator $G_2$, the first discriminator $D_B$, and the second discriminator $D_A$. In the method for training the asymmetric GAN to generate an image, learning operations are used to update the parameters of the first generator $G_1$, the second generator $G_2$, the first discriminator $D_B$, and the second discriminator $D_A$, so as to optimize the conversion performance of the asymmetric GAN 200.

Generally, the generator learns to generate a generated image from a real image to allow the discriminator to determine that the generated image is real (that is, to determine the generated image as the real image). The discriminator learns to distinguish the generated image from the real image. In other words, the discriminator learns to distinguish between the generated image and the real image by fighting against the generator until a balance is reached.

In step S302, the first generator $G_1$ may receive the first real image belonging to the first category and generate the first generated image accordingly, and may receive the second real image belonging to the second category and generate the second generated image accordingly. Referring to FIGS. 1 and 2, the first real image and the second real image in the real image data set 121 are respectively represented by $A_1$ and $A_2$, and the first generated image and the second generated image generated by the first generator $G_1$ are respectively represented by $B_1'$ and $B_2'$.

Specifically, the first category and the second category have available training samples, and the images included in these two categories are respectively the defect image and the non-defect image corresponding to the same first element. In an exemplary embodiment, the first real image $A_1$ and the second real image $A_2$ are, for example, represented in a matrix form and input to the first generator $G_1$.

In step S304, the second generator $G_2$ may receive the first generated image $B_1'$ and generate a first reconstructed image accordingly, and may receive the second generated image $B_2'$ and generate a second reconstructed image accordingly. Referring to FIG. 2, the first reconstructed image and the second reconstructed image generated by the second generator $G_2$ are respectively represented by $A_1''$ and $A_2''$.

For example, the first generated image $B_1'$ may be regarded as an artefact generated by the first generator $G_1$ based on the first real image $A_1$, and may be expressed as $G_1(A_1)$ in a mathematical formula. The first reconstructed image $A_1''$ may be regarded as an artefact generated by the second generator $G_2$ based on the first generated image $B_1'$, and may be expressed as $G_2(G_1(A_1))$ in a mathematical formula. Similarly, the second generated image $B_2'$ may be regarded as an artefact generated by the first generator $G_1$ based on the second real image $A_2$, and may be expressed as $G_1(A_2)$ in a mathematical formula. The second reconstructed image $A_2''$ may be regarded as an artefact generated by the second generator $G_2$ based on the second generated image $B_2'$, and may be expressed as $G_2(G_1(A_2))$ in a mathematical formula.

In step S306, the first discriminator $D_B$ may distinguish between the first generated image $B_1'$ and the third real image belonging to the third category to generate a first discrimination value. Referring to FIGS. 1 and 2, the third real image in the real image data set 121 is represented by $B_1$. Specifically, the third category has available training samples, and an image included in this third category correspond to the second element different from the first element and is a non-defect image.

In an exemplary embodiment, the first discriminator $D_B$ may be configured to distinguish between the first generated image $B_1'$ and the third real image $B_1$. In other words, the first discriminator $D_B$ is used to discriminate the similarity or difference between the first generated image $B_1'$ and the third real image $B_1$, and the first discrimination value is information representing the degree of similarity or difference between the images. The first discrimination value may be expressed as $D_B(G_1(A_1))$ in a mathematical formula. For example, the first discrimination value may be a value between 0 and 1, representing the probability of the first generated image $B_1'$ being determined as the third real image $B_1$. The larger the first discrimination value, the greater the similarity between the first generated image $B_1'$ and the third real image $B_1$. The smaller the first discrimination value, the greater the difference between the first generated image $B_1'$ and the third real image $B_1$. However, the definition of the first discriminant value is not limited thereto. The definition of the value may be adjusted according to operational requirements.

In an exemplary embodiment, the discrimination result (for example, the first discrimination value) of the first discriminator $D_B$ may be further used to update the parameter of the first discriminator $D_B$. For example, the first discriminator $D_B$ may be characterized as a plurality of third neural network weights. The first discriminator $D_B$ may input the first generated image $B_1'$ and/or the third real image $B_1$ corresponding to the third category in the real image data set 121 in FIG. 1 into the first discriminator $D_B$ and output the discrimination result. Next, the first discriminator $D_B$ calculates a first discrimination loss function value based on the discrimination result and a first discrimination loss function, and updates the third neural network weights of the first discriminator $D_B$ according to the first discrimination loss function value. The first discriminator loss function of the first discriminator $D_B$ may be based on cross-entropy or other appropriate error functions, and the disclosure is not limited thereto. For example, the first discrimination loss function used to train the first discriminator $D_B$ may be expressed in a mathematical formula as:

$$\mathcal{L}(D_B)=E_{b_1\sim pdata(b_1)}[\log D_B(b_1)]$$

In the above formula, $\mathcal{L}(D_B)$ represents the discrimination loss function of the first discriminator $D_B$, E is the expected value, $pdata(b_1)$ is the probability distribution of the third real image data set to which the third real image belongs, $b_1\sim pdata(b_1)$ represents the third real image $b_1$ randomly selected from the third real image data set to which the third real image belongs, and $D_B(b_1)$ is the identification result of the third real image $b_1$. The training goal of the first discriminator $D_B$ may be to update the third neural network weights of the first discriminator $D_B$ while minimizing the first discrimination loss function. The disclosure does not limit the method for the updating the neural network weights of the first discriminator $D_B$ thereto.

In step S308, the first generator $G_1$ may execute an operation to generate a first value according to the first real image $A_1$ and the first reconstructed image $A_1''$, execute an operation to generate a second value according to the second real image $A_2$ and the second reconstructed image $A_2''$, and update the parameter of the first generator $G_1$ according to the first discrimination value, the first value and/or the second value.

Specifically, the first generator $G_1$ calculates a first generation loss function value according to the first identification value, the first value and/or the second value and based on the first generation loss function, and further adjusts and updates the parameter of the first generator $G_1$ based on the calculated first generation loss function value. By using the first value and the second value as the loss function, the first generator $G_1$ may be prevented from constantly generating a same generated image to try to fool the first discriminator $D_B$.

In an exemplary embodiment, the first generation loss function used to train the first generator G1 may be expressed in a mathematical formula as:

$$\mathcal{L}(G_1)=E_{a_1\sim pdata(a_1)}[\log(1-D_B(G_1(a_1)))]+E_{a_1\sim pdata(a_1)}[\|G_2(G_1(a_1))-a_1\|]+E_{a_2\sim pdata(a_2)}[\|G_2(G_1(a_2))-a_2\|]$$

In the above formula, $\mathcal{L}(G_1)$ represents the first generation loss function, E is the expected value, pdata($a_1$) is the probability distribution of the first real image data set to which the first real image belongs, $a_1$~pdata($a_1$) represents a first real image $A_1$ randomly selected from the first real image data set to which the first real image belongs, $D_B(G_1(a_1))$ represents the first discrimination value, $G_2(G_1(a_1))$ represents the first reconstructed image, pdata($a_2$) is the probability distribution of the second real image data set to which the second real image belongs, $a_2$~pdata($a_2$) represents a second real image $A_2$ randomly selected from the second real image data set to which the second real image belongs, and $G_2(G_1(a_2))$ represents the second reconstructed image. In this exemplary embodiment, the first generation loss function value may be a value between 0 and 1. The lower the first generation loss function value, the closer the asymmetric GAN 200 is to an ideal status. However, the definition of each value is not limited thereto, and the definition of the values may be adjusted according to operational requirements.

In this exemplary embodiment, the first generator $G_1$ may be characterized as a plurality of first neural network weights, and the second generator $G_2$ may be characterized as a plurality of second neural network weights. In other words, the first generator $G_1$ and the second generator $G_2$ are different generators. In this exemplary embodiment, the first generator $G_1$ may perform a subtraction between the first real image $A_1$ and the first reconstructed image $A_1''$ to generate the first value, and perform a subtraction between the second real image $A_2$ and the second reconstructed image $A_2''$ to generate the second value. The training goal of the first generator $G_1$ may be to update the first neural network weights of the first generator $G_1$ while minimizing the first generation loss function (that is, minimizing the first discrimination loss function, and minimizing the first value and the second value). For example, the first generator $G_1$ may use gradient descent to perform back-propagation learning to adjust the first neural network weights to minimize the first generation loss function. However, the disclosure does not limit the method for updating the first neural network weights of the first generator $G_1$ thereto, and other methods may be used to update the weights according to requirements.

It is worth noting that through steps S302 to S308, the first generator $G_1$ learns to map the first real image $A_1$ to the first generated image $B_1'$, and learns to map the second real image $A_2$ to the second generated image $B_2'$, so that the first discriminator $D_B$ cannot distinguish between the first generated image $B_1'$ and the third real image $B_1$. In other words, the training goal of the first generator $G_1$ is to increase the error rate of the first discriminator $D_B$, that is, try to deceive the first discriminator $D_B$ so that the first discriminator $D_B$ determines that the first generated image $B_1'$ belongs to the third real image $B_1$. The training goal of the first discriminator $D_B$ is to reduce its own error rate, that is, try to distinguish between the first generated image $B_1'$ and the third real image $B_1$.

In step S310, the second generator $G_2$ may receive the third real image $B_1$ and generate a third generated image accordingly, and the first generator $G_1$ may receive the third generated image and generate a third reconstructed image accordingly. Referring to FIG. 2, the third generated image generated by the second generator $G_2$ is represented by $A_1'$, and the third reconstructed image generated by the first generator $G_1$ is represented by $B_1''$. The third generated image generated by the second generator $G_2$ is represented by $A_1'$, and the third reconstructed image generated by the first generator $G_1$ is represented by $B_1''$.

Specifically, the real image data set 121 does not include any real image belonging to the fourth category, so in step S310, only the real image of the third category is converted, which is different from step S302, in which two categories of real images are converted. In an exemplary embodiment, the third real image $B_1$ is represented in a matrix form and is input to the second generator $G_2$, for example.

For example, the third generated image $A_1'$ may be regarded as an artefact generated by the second generator $G_2$ based on the third real image $B_1$, and may be expressed as $G_2(B_1)$ in a mathematical formula. And the third reconstructed image $B_1''$ may be regarded as an artefact generated by the first generator $G_1$ based on the third generated image $A_1'$, and may be expressed as $G_1(G_2(B_1))$ in a mathematical formula.

In step S312, the second discriminator $D_A$ may distinguish between the third generated image $A_1'$ and the first real image $A_1$ to generate a second discrimination value. Specifically, the second discriminator $D_A$ may be configured to distinguish between the third generated image $A_1'$ and the first real image $A_1$. In other words, the second discriminator $D_A$ is used to discriminate the similarity or difference between the third generated image $A_1'$ and the first real image $A_1$, and the second discrimination value is information representing the degree of similarity or difference between the images. The second discrimination value may be expressed in a mathematical formula as $D_A(G_2(B_1))$. For example, the second discrimination value may be a value between 0 and 1, representing the probability of the third generated image $A_1'$ being determined as the first real image $A_1$. The larger the second discrimination value, the greater the similarity between the third generated image $A_1'$ and the first real image $A_1$. The smaller the second discrimination value, the greater the difference between the third generated image $A_1'$ and the first real image $A_1$. However, the definition of the second discriminant value is not limited thereto, and the definition of the value may be adjusted according to the operational requirements.

In an exemplary embodiment, the training method for the second discriminator DA is similar to that of the aforementioned first discriminator DB. Specifically, the discrimination result (for example, the second discrimination value) of the second discriminator DA may be further used to update the parameter of the second discriminator DA. For example, the second discriminator DA may be characterized as a plurality of fourth neural network weights. The second discriminator DA may input the third generated image $A_1'$ and/or the first real image $A_1$ corresponding to the first category in the real image data set 121 in FIG. 1 to the second discriminator DA and output the discrimination result. Next, the second discriminator DA calculates a second discrimination loss function value based on the discrimination result and a second discrimination loss function, and updates the fourth neural network weights of the second discriminator DA according to the second discrimination loss function value. The second discrimination loss function of the second discriminator DA may be based on cross-entropy or other appropriate error functions, and the disclosure is not limited thereto. For example, the second discrimination loss function used to train the second discriminator DA may be expressed in a mathematical formula as:

$$\mathcal{L}(D_A) = E_{a_1 \sim pdata(a_1)}[\log D_A(a_1)]$$

In the above formula, $\mathcal{L}(D_A)$ represents the discrimination loss function of the second discriminator $D_A$, E is the expected value, pdata($a_1$) is the probability distribution of the first real image data set to which the first real image belongs, $a_1$~pdata($a_1$) represents the first real image $a_1$ randomly selected from the first real image data set to which the first real image belongs, and $D_A(a_1)$ is the discrimination result of the first real image $a_1$. The training goal of the second discriminator $D_A$ may be to update the fourth neural network weights of the second discriminator $D_A$ while minimizing the second discrimination loss function. The disclosure does not limit the method for updating the neural network weights of the second discriminator $D_A$ thereto.

In step S314, the second generator $G_2$ may execute an operation to generate a third value according to the third real image $B_1$ and the third reconstructed image $B_1$", and update the parameter of the second generator $G_2$ according to the second identification value and/or the third value.

Specifically, the second generator $G_2$ calculates a second generation loss function value based on the second discrimination value and/or the third value, and calculates a second generation loss function value based on a second generation loss function, and further adjusts and updates the parameter of the second generator $G_2$ based on the calculated second generation loss function value. In an exemplary embodiment, the second generation loss function used to train the second generator $G_2$ may be expressed in a mathematical formula as:

$$\mathcal{L}(G_2) = E_{b_1 \sim pdata(b_1)}[\log(1 - D_A(G_2(b_1)))] + E_{b_1 \sim pdata(b_1)}[\|G_1(G_2(b_1)) - b_1\|]$$

In the above formula, $\mathcal{L}(G_2)$ represents the second generation loss function, E is the expected value, pdata($b_1$) is the probability distribution of the third real image data set to which the third real image belongs, $b_1$~pdata($b_1$) represents a third real image $b_1$ randomly selected from the third real image data set to which the third real image belongs, $D_A(G_2(b_1))$ represents the second discrimination value, and $G_1(G_2(b_1))$ represents the third reconstructed image. In this exemplary embodiment, the second generation loss function value may be a value between 0 and 1. The lower the second generation loss function value, the closer the asymmetric GAN 200 is to an ideal status. However, the definition of each value is not limited thereto, and the definition of the values may be adjusted according to operational requirements.

In this exemplary embodiment, the second generator $G_2$ may be characterized as a plurality of second neural network weights. The second generator $G_2$ may perform a subtraction between the third real image $B_1$ and the third reconstructed image $B_1$" to generate a third value. The training goal of the second generator $G_2$ may be to update the second neural network weights of the second generator $G_2$ while minimizing the second generation loss function (that is, minimizing the second discrimination loss function and the third value). For example, the second generator $G_2$ may use gradient descent to perform back-propagation learning to adjust the second neural network weights to minimize the second generation loss function. However, the disclosure does not limit the method for updating the second neural network weights of the second generator $G_2$ thereto, and other methods may be used to update the weights according to requirements.

It is worth noting that through steps S310 to S314, the second generator $G_2$ learns to map the third real image $B_1$ to the third generated image $A_1$', so that the second discriminator $D_A$ cannot distinguish the third generated image $A_1$' from the first real image $A_1$. In other words, the training goal of the second generator $G_2$ is to increase the error rate of the second discriminator $D_A$, that is, try to deceive the second discriminator $D_A$ so that the second discriminator $D_A$ determines that the third generated image $A_1$' belongs to the first real image $A_1$. The training goal of second discriminator $D_A$ is to reduce its own error rate, that is, try to distinguish the third generated image $A_1$' from the first real image $A_1$.

In an exemplary embodiment, the asymmetric GAN 200 with an asymmetric architecture as described above may train the first generator $G_1$, the second generator $G_2$, the first discriminator $D_B$, and the second discriminator $D_A$ through executing multiple iterations, so as to adjust and update the parameters of the first generator $G_1$, the second generator $G_2$, the first discriminator $D_B$, and the second discriminator $D_A$ until an optimal goal is reached. In other words, in the method for training the asymmetric GAN to generate an image of this exemplary embodiment, the minimized first generation loss function of the first generator $G_1$ and the maximized first discriminator loss function of the first discriminator $D_B$ fight against each other, and the minimized second generation loss function of the second generator $G_2$ and the maximized second discriminator loss function of the second discriminator $D_A$ fight against each other, until a balance point is reached to achieve the optimal goal. Here, after the optimal goal is reached, the asymmetric GAN 200 may be determined to have completed learning.

On the other hand, a default threshold value may be set to determine whether the asymmetric GAN 200 has completed learning. This default threshold value is related to the number of iterations. Specifically, suppose a first iterative operation of this exemplary embodiment includes updating the first discriminator $D_B$ and first generator $G_1$ according to the first real image $A_1$, a second iterative operation of this exemplary embodiment includes updating the first generator $G_1$ according to the second real image $A_2$, and a third iterative operation of this exemplary embodiment updates the second discriminator $D_A$ and second generator $G_2$ according to the third real image $B_1$. When the asymmetric GAN 200 executes one iterative operation, the count value of iterative operations may be accumulated, and when this count value reaches the default threshold value, the asymmetric GAN 200 is determined to have completed learning. In other exemplary embodiments, whether the first generation loss function value, the second generation loss function value, the first discrimination loss function value, and the second discrimination loss function value are all less than or equal to the default threshold value or whether they all converge may be used to determine whether the asymmetric GAN 200 has completed learning, and the disclosure is not limited thereto.

It is worth noting that the execution sequence between step S302 to S308 and step S310 to S314 of this exemplary embodiment are interchangeable. That is, in other embodiments, S302 to S308 may be sequentially executed after S310 to S314, so the execution sequence of the steps is not limited to this exemplary embodiment.

Figure 4:
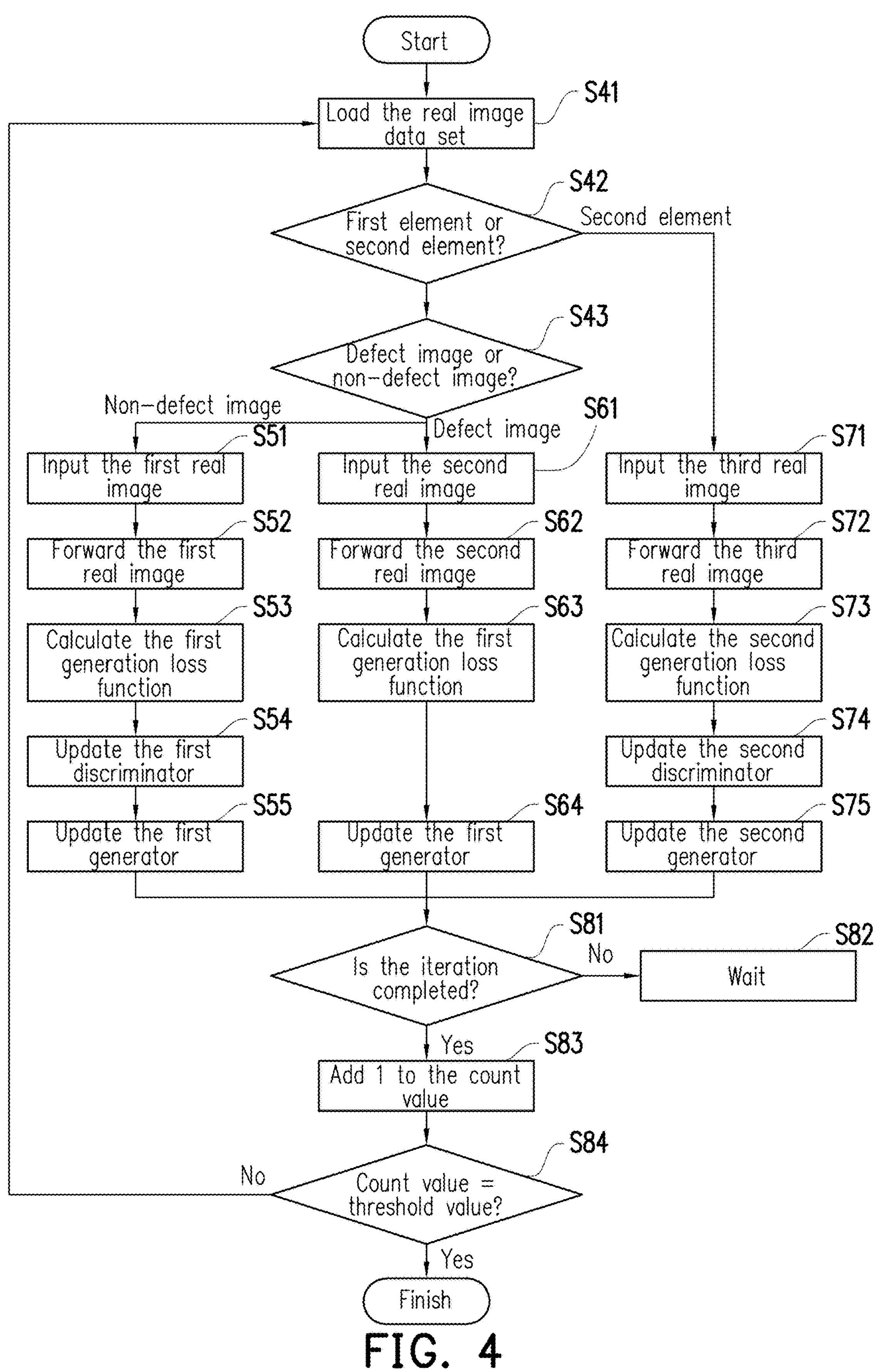
FIG. 4 illustrates a flow chart of an iterative process of an asymmetric GAN according to an exemplary embodiment.

FIG. 4 illustrates a flow chart of an iterative process of an asymmetric GAN according to an exemplary embodiment. Referring to FIG. 4, the method in this exemplary embodiment is adapted for being executed by the training system (for example, the processor 110 in FIG. 1) used to train the asymmetric GAN 200 in FIG. 2. The following illustrates the detailed steps of the iterative process of training the asymmetric GAN in this embodiment by using the embodiment of FIG. 2.

First, the processor 110 executes an instruction to determine which generator in the asymmetric GAN 200 to which an image is input for an iterative operation is used. Referring to FIG. 4, in step S41, the processor 110 loads the real image data set 121 and obtains a real image. Next, the processor 110 determines in step S42 that the real image corresponds to the first element or the second element, and in step S43 determines that the real image corresponds to a defect image or a non-defect image. Specifically, if the processor 110 determines that the real image corresponds to the first element and the non-defect image (that is, determines that the real image belongs to the first category), in step S51, the real image is used as the first real image to be input to the first generator $G_1$, and the first iterative operation of steps S52 to S55 is executed. If the processor 110 determines that the real image corresponds to the first element and the defect image (that is, determines that the real image belongs to the second category), in step S61, the real image is used as the second real image to be input to the first generator $G_1$, and the second iterative operation of steps S62 to S64 is executed. If the processor 110 determines that the real image corresponds to the second element and the defect image (that is, determines that the real image belongs to the third category), in step S71, the real image is used as the third real image to be input to the second generator $G_2$, and the third iterative operation of steps S72 to S75 is executed. It is worth noting that this exemplary embodiment does not limit the execution sequence of the first iterative operation, the second iterative operation, and the third iterative operation, which may be executed at the same time or in sequence.

In step S81, the processor 110 determines whether the iteration is completed during the iteration process. If the iteration has not been completed (that is, the determination is No in step S81), the processor 110 waits for the iteration to be completed in step S82. If the iteration has been completed (that is, the determination is Yes in step S81), the processor 110 adds 1 to the count value in step S83, and determines whether the count value has reached the default threshold value in step S84. If the count value has not reached the default threshold value (that is, the determination is No in step S84), the processor 110 executes the aforementioned step S41 to obtain the next real image and continues to execute determination and iterative operation. If the count value has reached the default threshold value (that is, the determination is Yes in step S84), the processor 110 may determine that the asymmetric GAN 200 has completed learning.

Specifically, in the first iterative operation of steps S52 to S55, the asymmetric GAN 200 forwards the first real image $A_1$; that is, the first generator $G_1$ receives the first real image $A_1$ and generates the first generated image $B_1'$ accordingly, and the second generator $G_2$ receives the first generated image $B_1'$ and generates the first reconstructed image $A_1''$ accordingly. Next, the first generator $G_1$ calculates the first generation loss function. The asymmetric GAN 200 updates the first discriminator $D_B$ according to the first generated image $B_1'$ and the first reconstructed image $A_1''$, and updates the first generator $G_1$ according to the first generation loss function.

On the other hand, in the second iterative operation of steps S62 to S64, the asymmetric GAN 200 forwards the second real image $A_2$; that is, the first generator $G_1$ receives the second real image $A_2$ and generates the second generated image $B_2'$ accordingly, and the second generator $G_2$ receives the second generated image $B_2'$ and generates the first reconstructed image $A_2''$ accordingly. Next, the first generator $G_1$ calculates the first generation loss function, and updates the first generator $G_1$ according to the first generation loss function.

On the other hand, in the third iterative operation of steps S72 to S75, the asymmetric GAN 200 forwards the third real image $B_1$; that is, the second generator $G_2$ receives the third real image $B_1$ and generates the third generated image $A_1'$ accordingly, and the first generator $G_1$ receives the third generated image $A_1'$ and generates the third reconstructed image $B_1''$ accordingly. Next, the second generator $G_2$ calculates the second generation loss function. The asymmetric GAN 200 updates the second discriminator $D_A$ according to the third generated image $A_1'$ and the third reconstructed image $B_1''$, and updates the second generator $G_2$ according to the second generation loss function.

Referring to FIG. 3 again, in step S316, the fourth real image belonging to the second category is input to the first generator $G_1$ in the trained asymmetric GAN 200 to generate a defect image. The defect image belongs to an image of the fourth category. In the above exemplary embodiment, the system trains the asymmetric architecture of the asymmetric GAN 200 according to the real image and the artefact (the generated image and the reconstructed image) to learn the neural network weights used by the first generator $G_1$ and the second generator $G_2$, so that the real image belonging to the second category becomes close to the real image of the fourth category through the generated image mapped by the first generator $G_1$.

Figure 5:
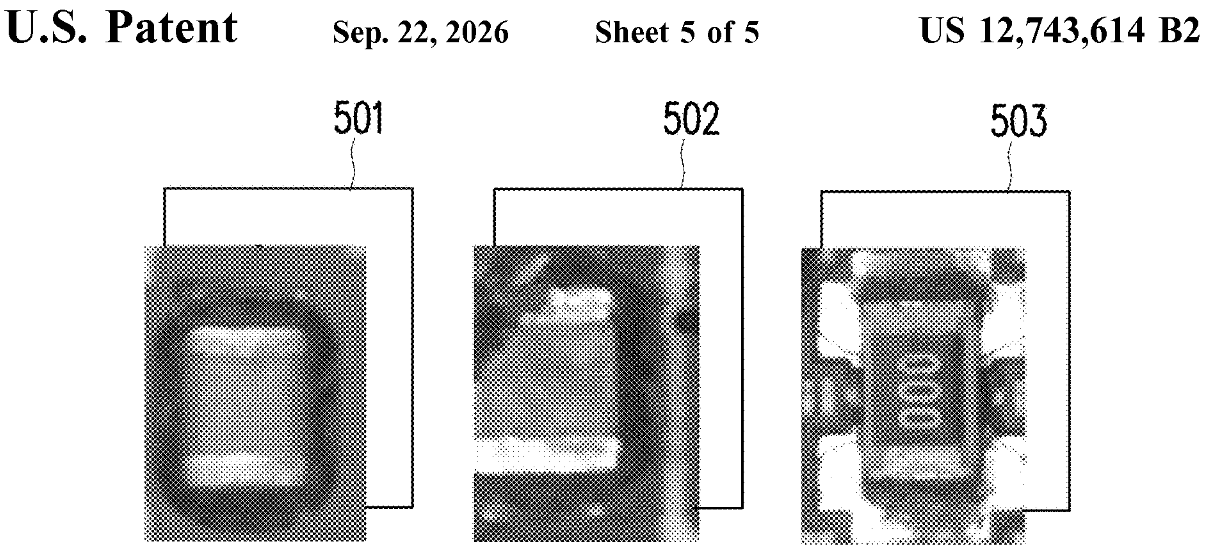
FIG. 5 illustrates an example of real images according to an exemplary embodiment.
Figure 6:
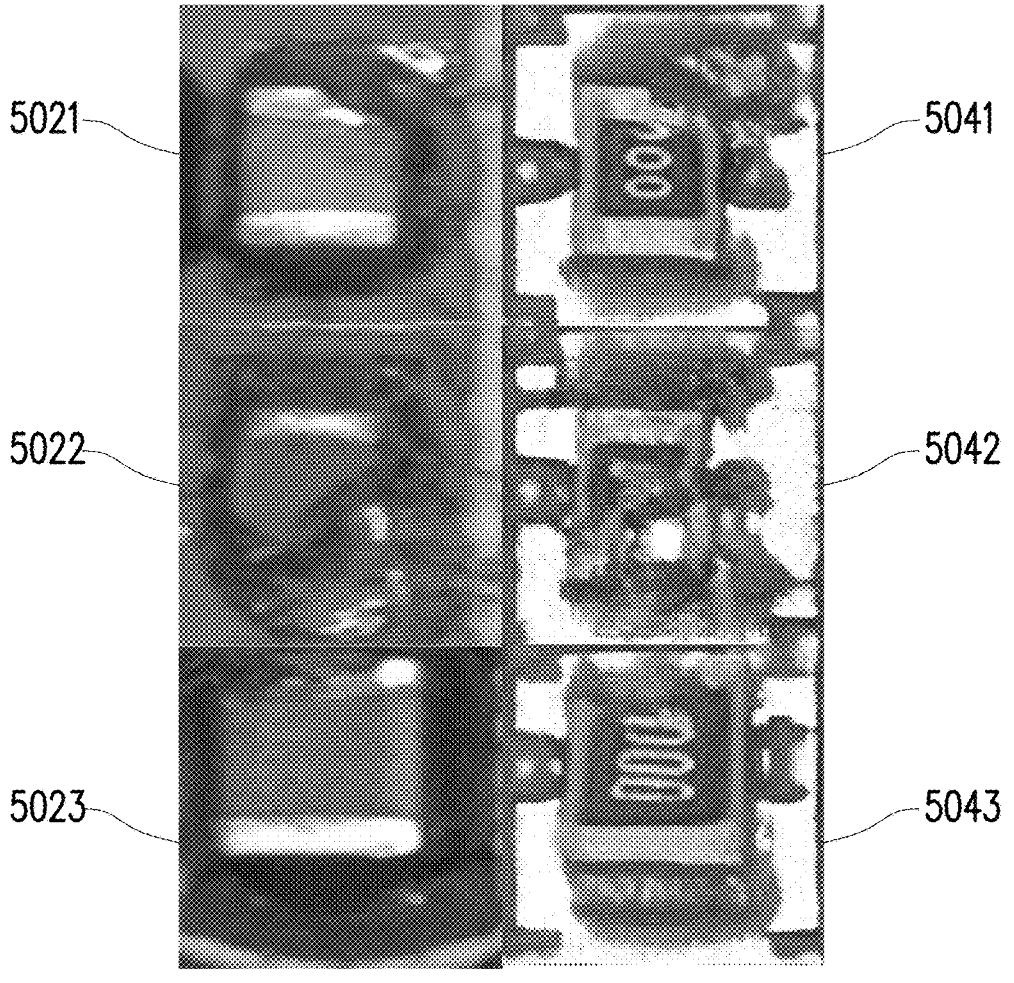
FIG. 6 illustrates an example of second real images and output results of a first generator according to an exemplary embodiment.

FIG. 5 illustrates an example of real images according to an exemplary embodiment. FIG. 6 illustrates an example of second real images and output results of a first generator according to an exemplary embodiment. Referring to FIGS. 1 and 5, the real image data set 121 of this exemplary embodiment includes but is not limited to an image data set 501, an image data set 502, and an image data set 503. The image data set 501 includes the real images corresponding to the first category, and these real images are non-defect images of the first element. The image data set 502 includes the real images corresponding to the second category, and these real images are defect images of the first element. The image data set 503 includes real images corresponding to the third category, and these real images are non-defect images of the second element. In this exemplary embodiment, the training system may use the images in the image data set 501, the image data set 502, and the image data set 503 to train the asymmetric GAN 200 in FIG. 2. Specifically, the real images in the image data set 501, the image data set 502, and the image data set 503 may be respectively used as the first real image $A_1$, the second real image $A_2$, and the third real image [$B_1$] $B_1$ in FIG. 2 to train the asymmetric GAN 200 as illustrated in FIG. 2.

Next, referring to FIGS. 2 and 6, the trained asymmetric GAN 200 may be used to convert a real image belonging to the second category into an artifact belonging to the fourth category; that is, this artifact may be regarded as the defect image of the second element. As shown in [FIG.] FIGS. 2 and 6, the first generator $G_1$ trained by the method for training the asymmetric GAN to generate an image provided in this exemplary embodiment may map real images 5021, 5022 and 5023 belonging to the second category to respectively produce artifacts 5041, 5042 and 5043, and these artifacts 5041, 5042 and 5043 are the defect images of the second element.

In summary, in the method for training an asymmetric GAN to generate an image and the electronic apparatus using this method proposed by an exemplary embodiment, through images belonging to the first category, the second category, and the third category, machine learning may be executed to train the asymmetric GAN to update the parameters of the first generator, the second generator, the first discriminator, and the second discriminator. In this way, the first generator included in the trained asymmetric GAN may transfer defect features of an element onto images of another element to generate defect images belonging to the fourth category, thereby improving the performance of image conversion by the first generator.

Although the disclosure has been disclosed in the above by way of embodiments, the embodiments are not intended to limit the disclosure. Those with ordinary knowledge in the technical field can make various changes and modifications without departing from the spirit and scope of the disclosure. Therefore, the protection scope of the disclosure is subject to the scope of the appended claims.

What is claimed is:

1. A method for training asymmetric generative adversarial network to generate an image, adapted for an electronic apparatus comprising a processor, wherein the method comprises:

inputting, by the processor, a first real image belonging to a first category, a second real image belonging to a second category, and a third real image belonging to a third category to an asymmetric generative adversarial network to train the asymmetric generative adversarial network, wherein the first category and the second category belong to first element, wherein the third category belongs to second element, wherein the first element and the second element are different elements, wherein the asymmetric generative adversarial network comprises a first generator, a second generator, a first discriminator, and a second discriminator, wherein the first generator maps the first real image to a first generated image so that the first discriminator does not distinguish between the first generated image and the third real image, wherein the first discriminator is updated according to the first generated image, wherein the training of the asymmetric generative adversarial network comprises:

determining whether the inputted real image corresponds to the first element or the second element, and determining whether the inputted real image has defective features;

selectively updating one or more of the first generator, the second generator, the first discriminator, and the second discriminator based on the first element or the second element and based on the inputted real image with the defective features or not;

wherein the first generator receives the second real image and generates a second generated image accordingly, and the second generator receives the second generated image and generates a second reconstructed image accordingly, and the first generator executes an operation to generate a second value according to the second real image and the second reconstructed image, and updates a parameter of the first generator according to the second value; and inputting, by the processor, a fourth real image belonging to the second category to the first generator in the asymmetric generative adversarial network that is trained to generate a defect image, wherein the first real image and the third real image do not have defective features, and the second real image and the fourth real image have defective features, wherein the defect image belongs to a fourth category, and the fourth category does not have a training sample, wherein the fourth category belongs to the second element, wherein the defect image is generated based on the fourth real image of the second category with the defective features and the third real image of the third category without the defective features.

2. The method for training asymmetric generative adversarial network to generate an image according to claim 1, wherein the first generator receives the first real image and generates a first generated image accordingly, and the second generator receives the first generated image and generates a first reconstructed image accordingly, and the first generator executes an operation to generate a first value according to the first real image and the first reconstructed image, and updates the parameter of the first generator according to the first value.

3. The method for training asymmetric generative adversarial network to generate an image according to claim 2, wherein the first discriminator distinguishes between the first generated image and a third real image belonging to a third category to generate a first discrimination value, and the first generator updates the parameter of the first generator according to the first discrimination value.

4. The method for training asymmetric generative adversarial network to generate an image according to claim 3, wherein the first discriminator is characterized as a plurality of third neural network weights, and the first discriminator updates a parameter of the first discriminator according to the first discrimination value.

5. The method for training asymmetric generative adversarial network to generate an image according to claim 2, wherein the first generator performs a subtraction between the first real image and the first reconstructed image to generate the first value, and performs a subtraction between the second real image and the second reconstructed image to generate the second value.

6. The method for training asymmetric generative adversarial network to generate an image according to claim 1, wherein the first generator is characterized as a plurality of first neural network weights, wherein updating the parameter of the first generator comprises:

updating the plurality of first neural network weights while minimizing a first generation loss function.

7. The method for training asymmetric generative adversarial network to generate an image according to claim 1, wherein the second generator receives the third real image and generates a third generated image accordingly, and the first generator receives the third generated image and generates a third reconstructed image accordingly, the second discriminator distinguishes between the third generated image and the first real image to generate a second discrimination value, and the second generator executes an operation to generate a third value according to the third real image and the third reconstructed image, and updates a parameter of the second generator according to at least one of the second discrimination value and the third value.

8. The method for training asymmetric generative adversarial network to generate an image according to claim 7, wherein the second discriminator is characterized as a plurality of fourth neural network weights, and the second discriminator updates a parameter of the second discriminator according to the second discrimination value.

9. The method for training asymmetric generative adversarial network to generate an image according to claim 7, wherein the second generator is characterized as a plurality of second neural network weights, and updating the parameter of the second generator comprises:

updating the plurality of second neural network weights while minimizing a second generation loss function.

10. The method for training asymmetric generative adversarial network to generate an image according to claim 7, wherein the second generator performs a subtraction between the third real image and the third reconstructed image to generate the third value.

11. The method for training asymmetric generative adversarial network to generate an image according to claim 1, wherein the asymmetric generative adversarial network executes a plurality of iterative operations to train the first generator, the second generator, the first discriminator, and the second discriminator.

12. The method for training asymmetric generative adversarial network to generate an image according to claim 11, wherein the iterative operations comprise:

when executing a first iterative operation, updating the first discriminator and the first generator according to the first real image;

when executing a second iterative operation, updating the first generator according to the second real image; and when executing a third iterative operation, updating the second discriminator and the second generator according to the third real image.

13. An electronic apparatus using training asymmetric generative adversarial network to generate an image, comprising:

a storage device, configured to store a real image data set and one or more instructions; and a processor, coupled to the storage device, configured to execute the instructions:

inputting a first real image belonging to a first category, a second real image belonging to a second category, and a third real image belonging to a third category to an asymmetric generative adversarial network to train the asymmetric generative adversarial network, wherein the first category and the second category belong to first element, wherein the third category belongs to second element, wherein the first element and the second element are different elements, wherein the asymmetric generative adversarial network comprises a first generator, a second generator, a first discriminator, and a second discriminator, wherein the first generator maps the first real image to a first generated image so that the first discriminator does not distinguish between the first generated image and the third real image, wherein the first discriminator is updated according to the first generated image, wherein the training of the asymmetric generative adversarial network comprises:

determining whether the inputted real image corresponds to the first element or the second element, and determining whether the inputted real image has defective features;

selectively updating one or more of the first generator, the second generator, the first discriminator, and the second discriminator based on the first element or the second element and based on the inputted real image with the defective features or not;

wherein the first generator receives the second real image and generates a second generated image accordingly, and the second generator receives the second generated image and generates a second reconstructed image accordingly, and the first generator executes an operation to generate a second value according to the second real image and the second reconstructed image, and updates a parameter of the first generator according to the second value; and inputting a fourth real image belonging to the second category to the first generator in the asymmetric generative adversarial network that is trained to generate a defect image, wherein the first real image and the third real image do not have defective features, and the second real image and the fourth real image have defective features, wherein the defect image belongs to a fourth category, and the fourth category does not have a training sample, wherein the fourth category belongs to the second element, wherein the defect image is generated based on the fourth real image of the second category with the defective features and the third real image of the third category without the defective features.

14. The electronic apparatus using training asymmetric generative adversarial network to generate an image according to claim 13, wherein the first generator receives the first real image and generates a first generated image accordingly, and the second generator receives the first generated image and generates a first reconstructed image accordingly, and the first generator executes an operation to generate a first value according to the first real image and the first reconstructed image, and updates the parameter of the first generator according to the first value.

15. The electronic apparatus using training asymmetric generative adversarial network to generate an image according to claim 14, wherein the first discriminator distinguishes between the first generated image and a third real image belonging to a third category to generate a first discrimination value, and the first generator updates the parameter of the first generator according to the first discrimination value.

16. The electronic apparatus using training asymmetric generative adversarial network to generate an image according to claim 15, wherein the first discriminator is characterized as a plurality of third neural network weights, and the first discriminator updates a parameter of the first discriminator according to the first discrimination value.

17. The electronic apparatus using training asymmetric generative adversarial network to generate an image according to claim 14, wherein the first generator performs a subtraction between the first real image and the first reconstructed image to generate the first value, and performs a subtraction between the second real image and the second reconstructed image to generate the second value.

18. The electronic apparatus using training asymmetric generative adversarial network to generate an image according to claim 13, wherein the first generator is characterized as a plurality of first neural network weights, and the operation of updating the parameter of the first generator comprises:

updating the plurality of first neural network weights while minimizing a first generation loss function.

19. The electronic apparatus using training asymmetric generative adversarial network to generate an image according to claim 13, wherein the second generator receives the third real image and generates a third generated image accordingly, and the first generator receives the third generated image and generates a third reconstructed image accordingly, the second discriminator distinguishes between the third generated image and the first real image to generate a second discrimination value, and the second generator executes an operation to generate a third value according to the third real image and the third reconstructed image, and updates a parameter of the second generator according to at least one of the second discrimination value and the third value.

20. The electronic apparatus using training asymmetric generative adversarial network to generate an image according to claim 19, wherein the second discriminator is characterized as a plurality of fourth neural network weights, and the second discriminator updates a parameter of the second discriminator according to the second discrimination value.

21. The electronic apparatus using training asymmetric generative adversarial network to generate an image according to claim 19, wherein the second generator is characterized as a plurality of second neural network weights, wherein the operation of updating the parameter of the second generator comprises:

updating the plurality of second neural network weights while minimizing a second generation loss function.

22. The electronic apparatus using training asymmetric generative adversarial network to generate an image according to claim 19, wherein the second generator performs a subtraction between the third real image and the third reconstructed image to generate the third value.

23. The electronic apparatus using training asymmetric generative adversarial network to generate an image according to claim 13, wherein the asymmetric generative adversarial network executes a plurality of iterative operations to train the first generator, the second generator, the first discriminator, and the second discriminator.

24. The electronic apparatus using training asymmetric generative adversarial network to generate an image according to claim 23, wherein the iterative operations comprise:

when executing a first iterative operation, updating the first discriminator and the first generator according to the first real image;

when executing a second iterative operation, updating the first generator according to the second real image; and when executing a third iterative operation, updating the second discriminator and the second generator according to the third real image.

25. The method for training asymmetric generative adversarial network to generate an image according to claim 1, wherein an error rate of the first discriminator is increased.

* * * * *